June 2, 1953  W. J. BROWN  2,640,959
MOTOR CONTROL CIRCUIT
Filed July 8, 1950  5 Sheets-Sheet 1

*INVENTOR.*
WALTER J. BROWN
BY
Woodling and Krost,
Attys.

June 2, 1953 W. J. BROWN 2,640,959
MOTOR CONTROL CIRCUIT
Filed July 8, 1950 5 Sheets-Sheet 2

*INVENTOR.*
WALTER J. BROWN
BY
Woodling and Krost,
attys.

Fig. 13

June 2, 1953  W. J. BROWN  2,640,959
MOTOR CONTROL CIRCUIT
Filed July 8, 1950　　5 Sheets-Sheet 5

INVENTOR.
WALTER J. BROWN
BY
Woodling and Krost
attys.

Patented June 2, 1953

2,640,959

UNITED STATES PATENT OFFICE 2,640,959

MOTOR CONTROL CIRCUIT

Walter J. Brown, Cleveland Heights, Ohio

Application July 8, 1950, Serial No. 172,647

17 Claims. (Cl. 321—18)

My invention relates in general to control systems and especially to electrical control systems in conjunction with space discharge devices.

This application is a continuation-in-part of my application Ser. Nos. 770,968, 770,966 and 770,967, all of which were filed August 28, 1947, and entitled, respectively, "Phase Shift System," "Phase Shift Network" and "Phase Shift Bridge," and of my application Ser. No. 779,909, filed October 15, 1947, and entitled "Phase Shift Circuit," now Patents Nos. 2,524,761; 2,524,759; 2,524,760 and 2,524,762, respectively, all of which were issued on October 10, 1950.

An object of the invention is to provide a sensitive control of a space discharge device to control the conversion of energy from one form of electrical energy into another form.

Another object of the invention is to provide a sensitive phase shift system to control a space discharge device such as a gaseous rectifier, thus controlling the conversion of energy between alternating and direct current systems.

Another object of my invention is a phase shifting system for a rigid controlled rectifier supplying rectified current to a direct current motor.

Another object of my invention is the provision of a phase shifting network as applied to an electrical motor operable from a rectified alternating voltage source, wherein the phase shifting network is responsive to electrical changes in the motor operation and consequently shifts the phase of the grid of the rectifier tubes in accordance thereto.

Another object of my invention is the combination of an electric motor operable from thermionic rectifiers and a phase shifting network of high sensitivity capable of shifting the phase of the grid of these thermionic rectifiers more than 180 degrees relative to the energizing voltage of the phase shifting network, and which retains its high sensitivity over a full 180 degree phase shift.

Another object of my invention is a sensitive phase shifting network for use with a phase responsive electric power converter which network is controlled by the same type voltage as utilized in the load of the converter.

Another object of the invention is to provide a phase shift network to control a controllable rectifier supplying rectified current to a motor wherein the phase shift network and the rectifier are energized with voltages from either a single phase source or from different phases of an alternating current source such that in the event of failure of a variable reactance tube in the phase shift network the output voltage of the phase shift network will shift in phase in a direction to reduce the speed of the motor.

Other objects and a fuller understanding of the invention may be had by referring to the following description and claims, taken in conjunction with the accompanying drawings, in which:

Figure 1:
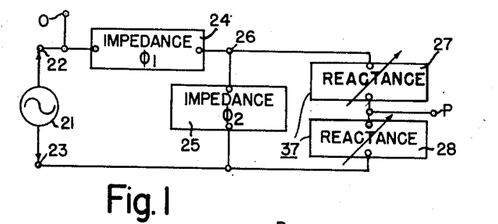
Figure 1 is a circuit diagram of a sensitive phase shifting system which may be used in my energy conversion system.

My energy conversion system has as its basis a sensitive phase shift system to control the energy passed by a space discharge device such as a controllable gaseous rectifier. My converter may be defined as comprising one or more space discharge devices provided with control means. The space discharge devices may comprise vapor or gas-filled rectifier tubes with thermionic cathodes or with pool type cathodes, such as mercury arc rectifiers. The control means may comprise an internal or external electrode or magnetic field. The circuit of Figure 1 shows a sensitive phase shift system wherein 21 designates an alternating current or periodic voltage source having first and second terminals 22 and 23. Serially connected across the first and second terminals are first and second impedances 24 and 25. The impedances 24 and 25 has a junction 26 and serially connected across the impedance 25, namely, at the junction 26 and the terminal 23, are first and second reactances 27 and 28 which comprise a second branch circuit 37. A first output terminal O is connected to the first terminal 22 and a second output terminal P is connected at the junction of the first and second reactances 27 and 28. These reactances have been shown as being mutually variable by an arrow therethrough, and it is to be understood that either or both of these reactances are variable as long as the relative impedance of the elements in this branch circuit is achieved. The first and second reactance elements 27 and 28 are of opposite reactive sign.

The first and second impedances 24 and 25 have been designated $\phi_1$ and $\phi_2$ to designate that the phase angles of these impedances are different. In this phase shift system the phase angles are preferably at quadrature relationship.

Figure 2:
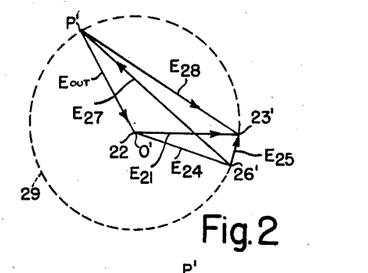
Figure 2 is a voltage vector diagram depicting the voltage vectors obtainable from the circuit of Figure 1.

The vector diagram of Figure 2 may be referred to as an aid in understanding the operation of the circuit in Figure 1. The voltage of the alternating current source 21 has been designated $E_{21}$ and extends horizontally to the right as a reference voltage. The potential at the terminals 22 and 23 has been designated by the points 22' and 23'. Similarly the potential at the terminal 26 has been designated by the point 26'. The voltages across the impedances 24 and 25 have been designated by the voltage vectors $E_{24}$ and $E_{25}$, and likewise the voltages across the reactances 27 and 28 have been designated $E_{27}$ and $E_{28}$. An output voltage of the phase shift system appears between the terminals O and P, and hence the points O' and P' designate the ends of the output voltage vector $E_{out}$.

Upon varying the relative impedances of the reactive elements 27 and 28, the relative lengths of the vectors $E_{27}$ and $E_{28}$ will vary, thus to shift the potential of the output terminal P. The point P' will follow a locus such as designated by the arc 29 on the vector diagram of Figure 2. By keeping the Q of the reactances 27 and 28 constant as the relative impedance is varied the locus 29 may be made the arc of a circle having the baseline $E_{25}$ as a chord. This may readily be seen from geometric theory. From the voltage vector diagram of Figure 2 it will be observed that the point O' has been placed at the approximate center of the arc. Thus as the relative impedance of the reactive elements 27 and 28 is varied the point P' will travel about the arcuate locus 29, thus to shift the phase of the output voltage $E_{out}$ relative to the alternating current input voltage $E_{21}$.

The impedances 24 and 25 have been stated as having phase angles substantially at quadrature which makes the angle between the voltage vectors $E_{24}$ and $E_{25}$ substantially a right angle. With the input voltage vector $E_{21}$ extending to the right the impedances 24 and 25 could be a resistance and an inductance, respectively, or they could be a capacitance and a resistance, respectively. If the impedances 24 and 25 were made a resistance and a capacitance, respectively, or an inductance and a resistance, respectively, then the point 26' would be above the horizontal input voltage vector $E_{21}$. This would necessarily make the chord $E_{25}$ above this input voltage vector $E_{21}$. If constant magnitude of output voltage is not essential, but merely a large angle of phase shift desirable, then particular care need not be taken to establish the point O' at the center of the arcuate locus 29 and also particular care need not be taken to maintain a substantially constant Q in the variable element.

Figure 3:
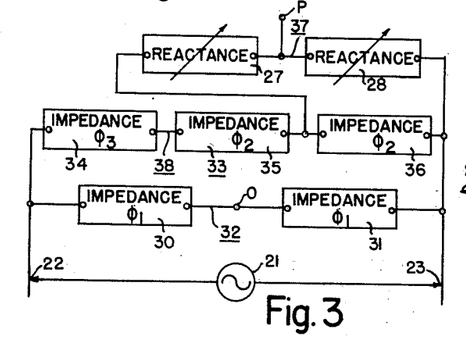
Figure 3 is a modified phase shift system that may be used in conjunction with my energy conversion system.

The circuit diagram of Figure 3 is a modification of my phase shift system wherein the alternating current source 21 energizes serially connected impedances 30 and 31 having substantially the same phase angle, designated as $\phi_1$. The first output terminal O is connected at the junction of these impedances 30 and 31, and these impedances form a first branch circuit 32.

A third branch circuit 33 is also connected across the alternating current source 21 and includes a fifth impedance 36 and, also includes impedance means 28 which consists of a third impedance 34, and a fourth impedance 35. The fourth and fifth impedances 35 and 36 have similar phase angles designated as $\phi_2$ and the third impedance 34 has another phase angle designated as $\phi_3$. The third and fourth impedances 34 and 35 may be lumped together as impedance means 38.

A second branch circuit 37 is connected across the fifth impedance 36 and it includes the first and second reactances 27 and 28. The second output terminal P is connected at the juncture of these reactances.

Figure 4:
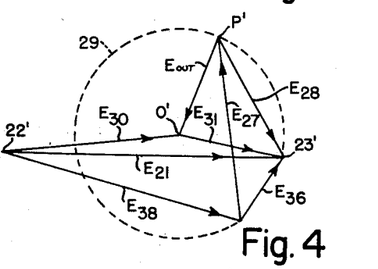
Figure 4 is a voltage vector diagram depicting the voltage vectors obtainable from the circuit of Figure 3.

The vector diagram of Figure 4 shows the vectors obtainable from the circuit of Figure 3 with vectors designated in a fashion similar to those in the vector diagram of Figure 2. The vectors $E_{30}$ and $E_{31}$ show that the first and second impedances 30 and 31 have phase angles $\phi_1$ which are substantially the same. The impedance means 38 has a voltage vector $E_{38}$ which is the combination of the phase angles $\phi_2$ and $\phi_3$ of the impedances 35 and 34, respectively. The phase angle $\phi_2$ of the impedances 35 and 36 may be the same as the phase angle $\phi_1$ of the impedances 30 and 31; however, this phase angle $\phi_2$ should be substantially at quadrature with the phase angle $\phi_3$ in order to place the baseline $E_{36}$ in a position such that the potential of the point O' lies substantially at the center of the arcuate locus 29. The impedance means 28 may, however, preferably consist of a single impedance element having a phase angle such as shown by the vector $E_{38}$ and its phase angle may be in quadrature with $\phi_2$ of impedance 36 so that the angle between the vectors $E_{38}$ and $E_{36}$ is a right angle. Similarly the phase angles of impedances 30 and 31 are preferably identical so that $E_{30}$ and $E_{31}$ are collinear and equal, so that they form a diameter of the arc 29, assuming said arc to be circular. In fact, the two impedances 30 and 31 may be two equal portions of a transformer winding which supplies energy to the phase shifting network.

Figure 5:
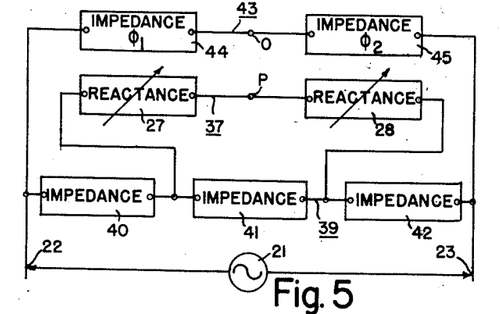
Figure 5 is a still further modification of a phase shift system that may be used with my energy conversion system.

The circuit diagram of Figure 5 shows a still further modification of my phase shift system which includes a first branch circuit 39 connected across the alternating current source 21. This first branch circuit 39 includes serially connected first, second and third impedances 40, 41 and 42. A third branch circuit 43 is also connected across the alternating current source 21 and includes fourth and fifth impedances 44 and 45 serially connected with the first output terminal O connected therebetween. These fourth and fifth impedances 44 and 45 have been shown with phase angles $\phi_1$ and $\phi_2$, respectively, and these phase angles are preferably substantially at quadrature. The second branch circuit 37 is connected across the second impedance 41 and this second branch circuit 37 incdludes the reactances 27 and 28 with the second output terminal connected therebetween.

Figure 6:
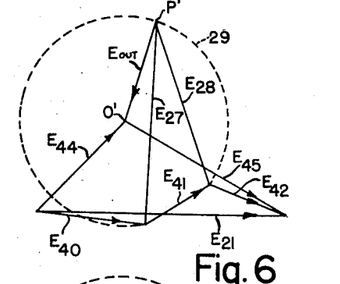
Figure 6 is a voltage vector diagram of the vectors obtainable from the circuit of Figure 5.

The vector diagram shown in Figure 6 is an explanation of the vectors obtainable from the circuit diagram of Figure 5 with the vectors thereon indicated in a fashion similar to the vector diagrams of Figures 2 and 4. It will be noted that the vectors of the impedances 40, 41 and 42 as depicted in Figure 6 do not lie on a straight line, rather, the baseline vector $E_{41}$ is at a considerable angle to the input voltage vector $E_{21}$. This is so that the baseline vector $E_{41}$ will, with the first output terminal O', form an isosceles triangle having the baseline vector $E_{41}$ as a base. The vectors $E_{44}$ and $E_{45}$ show that the phase angles $\Phi_1$ and $\Phi_2$ of the impedances 44 and 45, respectively, are substantially in quadrature. However, the vectors $E_{40}$, $E_{41}$ and $E_{42}$ are preferably established by a single impedance means 39 having tappings at each end of impedance 41 and in this case the vectors $E_{40}$, $E_{41}$, and $E_{42}$ are collinear. This single impedance means 39 may conveniently comprise a winding of a transformer which also comprises the phase shifter and which is divided by tappings into three sections 40, 41 and 42.

Figure 7:
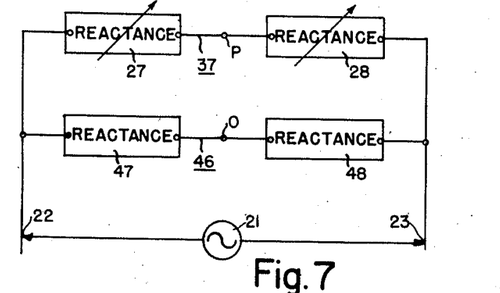
Figure 7 is a still further form of phase shift system for use in my energy conversion system.

The circuit diagram of Figure 7 shows a still further modification of a phase shift system which may be used with my energy conversion system, and this circuit includes the second branch circuit 37 as before which includes the first and second reactances 27 and 28 with the second output terminal P connected therebetween. Also connected across the alternating current source 21 is a first branch circuit 46 which includes third and fourth reactances 47 and 48 having the first output terminal O connected therebetween.

Figure 8:
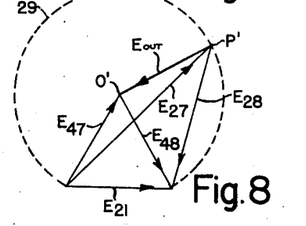
Figure 8 is a voltage vector diagram of the vectors obtainable from the circuit of Figure 7.

The Figure 8 is a vector diagram of the vectors obtainable from the circuit of Figure 7 with these vectors designated in a fashion similar to that shown in the vector diagrams of Figures 2, 4 and 6. In this case the voltage vector of the alternating current source 21 is also the baseline vector across which the variable reactances 27 and 28 are serially connected. In the circuit of Figure 7 the Q of the first branch circuit 46 has been made approximately half the Q of the third branch circuit 37 in order that the potential of the first output terminal O, designated by the point O', will be at or near the center of the arcuate locus 29. There is another method for establishing the point O' at or near the center of the arcuate locus 29. The energizing voltages for each of the branch circuits 37 and 46 may be unequal, and in such event, the product of the Q of branch circuit 37 times the energizing voltage of this branch circuit should be substantially twice the product of the Q of branch circuit 46 times the energizing voltage of this branch circuit.

In all the circuits of Figure 1, Figure 3, Figure 5 and Figure 7, the first and second reactive elements 27 and 28 must necessarily be of opposite sign to span the baseline chord of the locus 29 with point P' removed a considerable distance therefrom. Previously, it has been stated that the Q of the second branch circuit 37 is maintained substantially constant as the relative impedance of the elements therein is varied. This may be accomplished by selection of the proper type of reactive elements and one form of reactive element which will accomplish this purpose is the use of a reactance tube. The preferred form of a reactance tube comprises a pentode having a very high internal plate resistance such that the plate current is substantially independent of the plate voltage. The pentode is operated at constant screen voltage and an alternating current feedback circuit is provided from plate to grid so as to establish an alternating current grid-cathode voltage which is substantially in quadrature with the alternating current plate-cathode voltage, and which is superimposed on a direct current negative grid-biasing voltage. The alternating current plate current is in phase with the alternating current grid-cathode voltage and is accordingly substantially in quadrature with the alternating current plate-cathode voltage. Accordingly the tube exhibits the properties of a reactance having a Q which is dependent upon how nearly the phase angle of the alternating current feedback circuit approximates 90 degrees. Another approach to the explanation of how the arc 29 may be substantially circular is to state that the phase angle between vectors $E_{27}$ and $E_{28}$ is substantially constant. For the phase shifting network of Figure 7, it will be seen that the first output terminal O can be established at the center of such a circular arc if the point O' and vector $E_{21}$ establish an isosceles triangle with vector $E_{21}$ as a base and if the phase angle between the vectors $E_{47}$ and $E_{48}$ is substantially twice the phase angle between the vectors $E_{27}$ and $E_{28}$.

Figures 9, 10, 11:
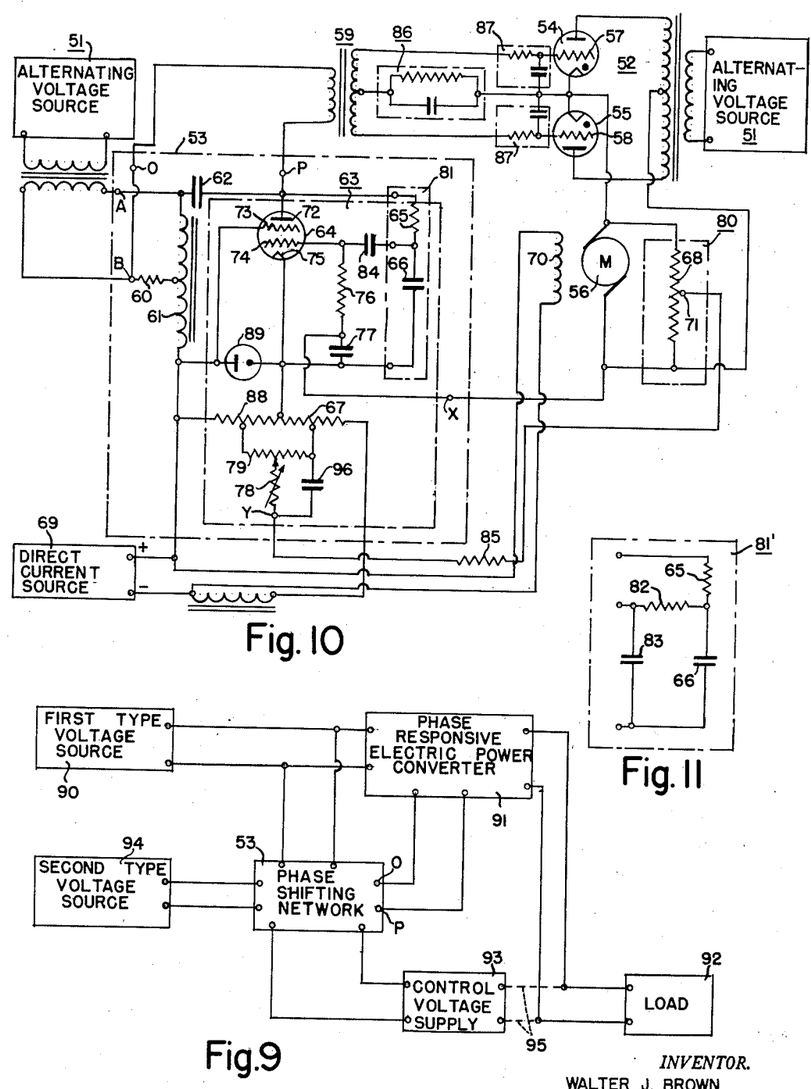
Figure 9 is a block diagram of an electrical system utilizing my phase shifting network for control of a phase responsive electric power converter.
Figure 10 is a circuit diagram of a motor control circuit having a phase shifting based on Figure 1 with a quadrature feedback circuit therein and embodying the principles of my invention.
Figure 11 is a circuit diagram of an alternative arrangement of a quadrature feedback circuit as used in the circuit of Figure 8.

Figure 9 illustrates in block form the adaptation of my phase shifting network to an electrical system that converts a first type of voltage into a second type of voltage for utilization in a load. A first type voltage source 90 supplies a first type voltage to a phase responsive electric power converter 91 and to a phase shifting network 53. The phase responsive electric power converter 91 converts the first type of voltage of the first type voltage source 90 into a second type of voltage for utilization in the load 92. A control voltage supply 93 obtains or generates a second type of voltage from, or in accordance with the operating conditions of, the load 92, for controlling the phase shifting network 53. A second type voltage source 94 supplies a second type voltage for the phase shifting network 53. The first and second types of voltages may be an alternating current voltage and a direct current voltage, or vice versa. One or the other of the first and second type voltage sources will be an alternating or periodic voltage source, and the phase shifting network 53 is capable of shifting the output voltage across the terminals O and P thereof relative to a reference voltage of this alternating voltage source. In operation, the electrical system as depicted in the Figure 9 may be applied in analogy to a frequency modulated radio transmitter, a where the first type voltage source 90 supplies a direct current voltage to both the phase shifting network 53, which would be the phase modulator, and to the phase responsive electric power converter 91, which would be the frequency multiplier and/or amplifier circuit of the rest of the frequency modulated radio transmitter. The phase responsive electric power converter 91 would supply an alternating voltage in the form of a frequency modulated carrier wave to the load 92, which would be an antenna or other similar load. The control voltage supply 93 would be an alternating voltage in the form of modulation energy, and as represented by the dotted lines 95 would be in accordance with the modulation requirement needed by the load, to supply modulation voltage to the phase shifting network 53. It will be seen that the control voltage is of the second type of voltage, namely, an alternating voltage. The second type voltage source 94 would be the carrier wave input energy which the modulation voltage of the control voltage source 93 modulates.

It will be seen that the electrical system of the Figure 9, as pertaining to a frequency modulated radio transmitter, converts direct current or constant voltage power into an alternating voltage power for utilization in the load.

The electrical system of Figure 9 may also be used to depict the circuit operation of the motor control circuit wherein a direct current motor is operated from a rectified alternating voltage source. In this analogy, the first type voltage source 90 would be an alternating voltage source supplying both the phase shifting network 53 and the phase responsive electric power converter 91, which would be a rectifier device. The phase responsive electric power converter 91, or rectifier device, supplies rectified alternating voltages to a load 92 which would be a direct current motor, or other load utilizing a direct current voltage. The control voltage supply 93 would utilize the second type voltage obtained from, or in accordance with, the load 92, to change the operating conditions of the phase shifting network 53, in order that the phase shifting network may control the phase responsive electric power converter 91. The second type voltage source 94 would be a direct current voltage source supplying operating voltages to the phase shifting network 53. The direct current voltage obtained from the rectifier device 91 would be controlled in accordance with the operating conditions of the load or motor 92 through the medium of the control voltage supply 93 and the phase shifting network 53. This could be accomplished by having a reactance tube in the phase shifting network which is controlled by the direct current voltage of the control voltage supply 93 to vary the bias of this reactance tube, and consequently its effective reactance or impedance. This varying impedance of the reactance tube in the phase shifting network 53 can be made to vary the operating conditions of the phase shifting network 53, and consequently the phase of the output voltage across the terminals O and P relative to the phase of the alternating voltage obtained from the first type voltage source 90.

The Figure 10 illustrates an application of a form of my phase shifting network of Figure 1 as applied to a motor control circuit or other device requiring a rectified alternating voltage input. An alternating voltage source 51 supplies voltage to a rectifier device 52 and to a phase shifting network 53. The rectifier device 52 supplies rectified alternating voltage to a load or motor armature 56. A controlled voltage source 80, which is responsive to operating conditions of the load or motor 56, is connected to the phase shifting network 53 for controlling same. A direct current source 69 supplies a constant direct voltage to the phase shifting network 53, which in turn supplies a voltage variable in phase relative to the alternating voltage source 51 for controlling the rectifier device 52. A field winding 70 is also connected across the direct current source 69. The rectifier device 52 has space discharge devices for rectification, which for purposes of illustration, but not limitation, have been shown as rectifier tubes 54 and 55, to supply full wave rectified currents to the load which is illustrated as a direct current motor armature 56. The space discharge devices or rectifier tubes 54 and 55 have some form of control means, illustrated by grids 57 and 58, respectively, connected to a grid transformer 59. The phase shifting network 53 has first and second input terminals A and B, respectively, connected across the alternating voltage source 51, and first and second output terminals O and P, respectively, supplying the grid transformer 59. The phase shifting network 53 includes a resistance 60, an inductive winding 61, a capacitance 62, and a variable inductance 63. The resistance 60 and a portion of the inductive winding 61 are connected across the input terminals A and B, and the capacitance 62 and variable inductance 63 are serially connected across the inductive winding 61 with the second output terminal P connected therebetween. The first output terminal O is connected to the second input terminal B. The variable inductance 63 includes a thermionic tube 64, a quadrature feedback circuit 81 to make the tube 64 act as an inductance, a plate and screen voltage divider 88, a voltage regulator 89, and a controlling voltage source 67. The tube 64 has an anode 72, a screen grid 73, a control grid 74 and a cathode 75.

The controlled voltage source 80 has a shunt resistance 68 across the motor 56 with a tap 71 thereon. The phase shifting network 53 has first and second control terminals X and Y connected to the controlled voltage source 80, with the first control terminal X being connected to the junction of the negative terminal of the motor armature 56 and one end of the shunt resistance 68, and the second control terminal Y being connected to the tap 71 on the shunt resistance 68 through a filter resistor 85. Within the phase shifting network 53, the first control terminal X is connected to the control grid 74 through a resistance 76, and to the cathode 75 through a condenser 77. The second control terminal Y is connected to the controlling voltage potentiometer 67 through an acceleration limiting resistor 78 and a speed control potentiometer 79. An acceleration limiting condenser 96 is connected across the acceleration resistor 78 and a portion of the potentiometer 79 to create therewith a time delay circuit. The quadrature feedback circuit 81 includes a resistance 65 and a condenser 66, which retards the phase of the voltage applied to the control grid 74 so that the tube 64 will act as an inductance. A condenser 84 is connected in series with the resistance 64 in the circuit between the anode 72 and the control grid 74, in order to isolate these two elements of the tube 64 for direct current voltages. The condenser 84 and the resistance 76 tend to destroy the quadrature feedback effect of the quadrature feedback circuit 81. To counteract the advancing of phase as produced by the condenser 84 and the resistance 76, I show a modified quadrature feedback circuit 81' in Figure 11. The modified quadrature feedback circuit 81' includes the resistance 65 and the condenser 66 as before, but also includes a further resistance 82 and condenser 83 to further retard the phase, in order to obtain a feedback voltage to the control grid 74 that is as close to 90 degrees retarded as desired.

In the rectifier device 52, a self-biasing means 86 is provided to help prevent accidental firing of the tubes 54 and 55 on the negative half cycle. Grid loading means 87 are connected in the grid-cathode circuit of the tubes 54 and 55 to prevent an effectual short circuit of half of the grid transformer when the respective tube is firing.

In operation, the alternating voltage source 51 supplies an alternating voltage of fixed magnitude and phase to both the rectifier device 52 and the phase shifting network 53. The phase shifting network 53, being responsive to the controlled voltage source 80, controls the rectifier device 52 by supplying a phase shifted voltage from its output terminals O and P. The voltage vector diagram of Figure 2 generally represents the voltage vectors obtainable from the phase shifting network 53, wherein the variable inductance 63, which is a reactance tube, varies the potential at the output terminal P about a circular locus, with the point O at the center thereof. The settings of the speed control potentiometer 79, and the acceleration limiting resistor 78 govern, respectively, the ultimate speed of the motor 56, and the rate of acceleration in coming up to that speed. The controlling voltage source 67 in opposition to the controlled voltage source 80 determines the bias at which the thermionic tube 64 operates, thereby determining its impedance, and consequently the operating point on the arcuate locus of the voltage vector diagram. When there is a high negative bias, the tube 64 has a high impedance, and the position of the point P' on the voltage vector diagram will be at its furthermost clockwise position. In this position, the voltage across the terminals O and P is 180 degrees out of phase with respect to the phase of the voltage of the alternating voltage source 51, and thereby the rectifier device 52 has no output. This provides a measure of safety should the tube 64 fail, for then the impedance thereacross would be infinite, and the rectifier device 52 would reduce its output to zero. When there is a low negative bias condition of the tube 64, the impedance of the tube 64 is low, thereby shifting the operating position of the point P' in a counterclockwise direction. The point P' may easily be shifted counterclockwise to permit the output voltage across the terminals O and P to be directly in phase with the voltage of the alternating voltage 51, thereby allowing the rectifier device 52 to have a full output. The speed control potentiometer 79 governs the speed of the motor armature 56 between these two limits, and consequently is connected across only a portion of the controlling voltage source 67 to establish these limits of control. The controlled voltage source 80 obtains a voltage that is proportional to speed from the shunt resistance 68. The control terminal X, which is connected to the shunt resistance 68, applies to the grid 74 a negative voltage approximately proportional to speed, which, as the speed increases, increases the negative bias of the tube 64 and consequently the impedance thereof, to decrease the output of the rectifier device 52 to maintain the speed substantially constant. The control terminal Y furnishes a return path for the direct current voltages obtained from the controlled voltage source 80 through the opposing controlling voltage source 67. The voltage obtained from the controlled voltage source 80 will not be a pure direct current, inasmuch as the motor 56 is being supplied with pulses of current from the rectifier device 52. A filtering arrangement for the controlled voltage is furnished by the condenser 77 and the filter resistor 85. A further filtering action is obtained by the resistance 76 in conjunction with the condensers 84 and 66. This filtering action assures that direct current control voltages are applied to the biasing means 67.

Figure 12:
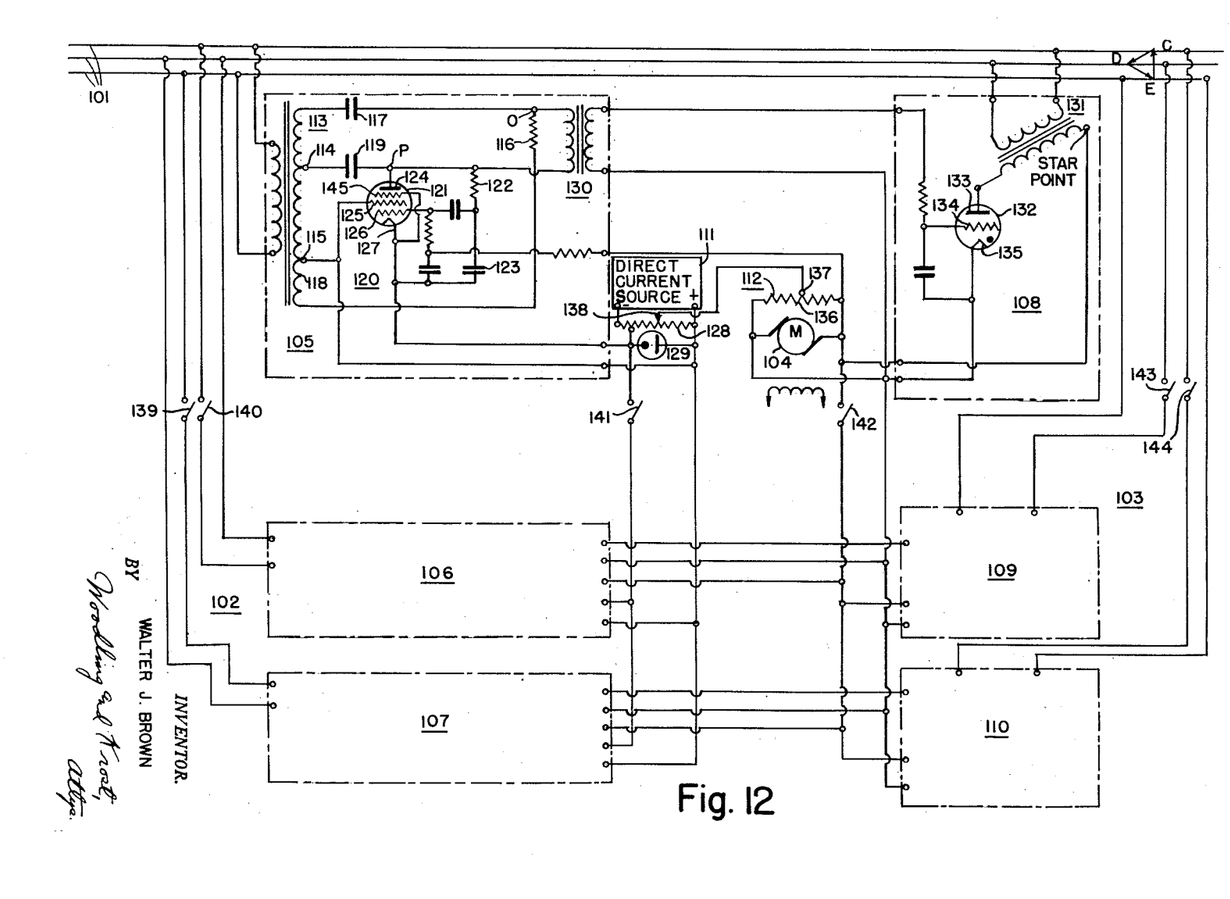
Figure 12 is a circuit diagram of a direct current motor system which includes the embodiment of my phase shifting system of Figure 5 to control a grid controlled rectifier for the said direct current motor.

Figure 12 illustrates my phase shifting system as used in conjunction with a three phase power supply and a grid controlled rectifier for supplying rectified power to a direct current motor. The system includes generally, a direct current motor armature 104, a grid controlled rectifier system 103 for supplying rectified power to the motor 104, a phase shifting system 102 for controlling the grid controlled rectifier system 103, a direct current source 111 for supplying operating voltages to the phase shifting system 102, a controlled voltage source 112 for controlling the operating conditions of the phase shifting system 102, and a three phase supply source 101 for supplying alternating voltages to the phase shifting system 102 and to the grid controlled rectifier system 103. The phase shifting system 102 includes three phases shifters designated 105, 106 and 107, respectively. The grid controlled rectifier system 103 includes rectifiers 108, 109 and 110, respectively. The three phase supply source 101 has three phases C, D and E, with the phase shifters 105, 106 and 107 energized, respectively, from the phases C, D and E. The rectifiers 108, 109 and 110 are energized, respectively, from the phases D, E and C. It will be seen that the rectifier 108 is energized from a different phase than the phase that is energizing the phase shifter 105. This has been done purposely as a safety measure which will be discussed more fully later. The motor control system is operable with only the phase shifter 105 and the rectifier 108, omitting the phase shifters 106 and 107 and the rectifiers 109 and 110. For this reason, the latter two phase shifters and rectifiers have been shown as having switches 139 to 144, for disconnection from the supply voltages and the load, which is to illustrate that the motor control system is operative either with or without these elements as part of the motor control system. The motor control system may be fully described by describing only the phase shifter 105 and rectifier 108, which will describe the operation of only single phase power supplied to the motor 104. It will be readily apparent to those skilled in the art that such a system for one phase may be easily duplicated for a three phase system or any polyphase system.

The phase shifter 105 is of the type of phase shifting system as shown in Figure 5, and vectorially illustrated in Figure 6. An input transformer 113, which is connected across phase C, has two taps 114 and 115 on the secondary 118 thereof. A resistance or resistive element 116 and a capacitance or capacitive element 117 are serially connected across the ends of the secondary 113, with the first output terminal O of the phase shifter connected therebetween. A capacitance or capacitive element 119 and a variable inductance or inductive element 120 are serially connected across the taps 114 and 115 with the second output terminal P of the phase shifter connected therebetween. The variable inductance 120 includes a thermionic tube 121, and a resistance 122 and capacitance 123 forming a quadrature feedback circuit to make the thermionic tube 121 exhibit the properties of a reactance tube, or in this case specifically as an inductance. The thermionic tube 121 has a plate 124, a screen grid 125, a control grid 126, a cathode 127 and a suppressor grid 145 connected to the cathode 127. Biasing and high voltage supplies are supplied to the tube 121 by a voltage divider 128 connected across the terminals of the direct current source 111. Positive direct current potentials are applied to the screen 125 and plate 124, and a negative potential is applied to the cathode 127. A voltage regulator tube 129 is connected across the plate and screen supply voltages. The operation of the phase shifter 105 is similar in operation to the operation of the circuit of Figure 5, wherein the potential of the output terminal P is variable throughout an arcuate locus by varying the variable inductance 120.

The rectifier 108 is illustrative of connection to one leg 131 of a delta-star connected three phase transformer. The secondary of the leg 131 has a rectifier tube 132 and the motor armature 104 connected across it. The output of the rectifier tube 132 is supplied to the motor armature 104 by the aforementioned series connection. The rectifier tube 132 has a plate 133, a grid 134 and a cathode 135. The output of the phase shifter 105 is supplied through an output transformer 130 to the grid 134 with respect to the cathode 135 of the rectifier tube 132. The star point, illustrated at one end of the secondary of the transformer leg 131, would be the star point or common point of the secondary of a three phase transformer, if a three phase rectifier system were used.

The controlled voltage source 112 includes a shunt resistance 136 connected across the motor armature 104. The shunt resistance 136 has a tap connection 137 for supplying a direct current feedback voltage to the phase shifter 105 through a movable contact 138 on the voltage divider 128. The direct current feedback voltage obtained from the shunt resistance 136 supplies a negative voltage to the grid 126 of the tube 121, whereas the voltage divider 128 supplies either a negative or a positive controlling voltage to control the amount of resultant bias applied to the tube 121. The amount of bias supplied to the tube 121 determines the effective reactance of this tube, and consequently the operating position of the output terminal P on the arcuate locus of the voltage vector diagram.

In operation, the three phase supply source 101 supplies alternating voltages of fixed magnitude and phase relationships to both the rectifier 108 and the phase shifter 105. The phase shifter 105, being responsive to the controlled voltage source 112 and the controlling voltage source 128, controls the rectifier 108 by supplying a phase shifted voltage from its output terminals O and P. The voltage vector diagram of Figure 6 represents the voltage vectors obtainable from the phase shifter 105, wherein the variable inductance 120, which is a reactance tube, varies the potential at the output terminal P about an arcuate locus, with the point O at or near the center thereof. However, the vectors $E_{40}$, $E_{41}$ and $E_{42}$ are collinear rather than angularly related as shown in Figure 6. The setting of the movable contact 138 governs the ultimate speed of the motor armature 104. The combination of the direct current feedback from the shunt resistor 136 and the controlling voltage obtained from the voltage divider 128, determines the bias applied to the tube 121. This bias determines the effective reactance of the tube 121, and consequently the operating point on the arcuate locus of the voltage vector diagram. When there is a high negative bias, the tube 121 has a high impedance or high effective reactance, and the position of point P' will be at its furthermost clockwise position. In this position, the voltage vector $E_{out}$ on the vector diagram of Figure 6 is about 60 degrees lagging of a zero reference line. The input voltage 115—114 obtained across the secondary of the input transformer 113 will be considered as the reference voltage having a zero phase according to standard electrical practice, or in other words the vector of the voltage 115—114 will be horizontal to the right. This vector represents the phase C, and, as will be seen at the upper right of the Figure 12, the vector representation is such that the phase D leads the phase C by 120 degrees. This means that the phase of the voltage applied to the rectifier 108 is 120 degrees leading with respect to the phase of the voltage supplying the phase shifter 105. Under a condition of high negative bias, with high effective reactance of the inductance 120, the vector O—P will be 60 degrees lagging the reference voltage 115—114, and the voltage applied across the plate 133 and cathode 135 of the rectifier tube 132 is 120 degrees leading this reference voltage. Therefore, it will be seen that the voltage applied to the grid 134 will be 180 degrees lagging the plate-cathode voltage. Under this condition, the tube will not fire during any portion of the cycle. This is the measure of safety which was recited earlier, in that should the tube 121 fail for any reason, which means it would have a theoretically infinite impedance, the phase of the voltage across the terminals O and P of this phase shifter 105 would then be such as to cause the rectifier 108 to be turned off. This measure of safety is quite important to prevent the motor armature 104 from going to a high or full speed from its former predetermined speed setting upon the failure of the reactance tube 121. Care must be taken in the circuit design to prevent more than 180 degrees lagging current, or this will cause this rectifier tube to turn full on, with full excitation supplied to the motor armature 103. A fixed phase shifting network may be supplied in the circuit in such a manner to prevent such an occurrence, and I have found that the output transformer 130 and the resistance-capacity filters in the grid circuits of the rectifier tubes cause a slight shift in phase which also must be taken into account in the design of the circuit.

When there is a low negative bias condition applied to the tube 121, the impedance or effective reactance of this tube 121 is low, thereby shifting the operating point of the output terminal P in a counterclockwise direction. The point P' on the voltage vector diagram may easily be shifted counterclockwise sufficiently to permit the output voltage across the terminals O and P to be directly in phase with the voltage applied to the plate and cathode of the rectifier tube 132. This allows the rectifier tube 132 to have a full output. The controlled voltage source 112 obtains a voltage that is approximately proportional to speed from the shunt resistor 136. As the speed of the motor armature 104 increases, a greater voltage is obtained across the shunt resistor 136, thereby applying a more negative voltage to the grid 126 of the thermionic tube 121, which increases its effective reactance and thereby causes the output voltage O—P to be more lagging to reduce the output of the rectifier 108 and consequently lower the speed of the motor armature 104. Thus a balance is always maintained between the controlled voltage taken from the motor armature 104 and the controlling voltage applied from the biasing voltage divider 128; thus, the motor voltage is held substantially constant at a value dependent upon the setting of the controlling voltage divider 128.

The operation of the phase shifter 105 and rectifier 108 are complete as they have been described as being excited from different phases of a three phase supply. As mentioned above, other phase shifters 106 and 107 may be employed in conjunction with other rectifiers 109 and 110, by closing the switches 139, 140, 143 and 144. Switch means 141 is shown for connecting the direct current source 111 and the control voltage supply 112 to the phase shifters 106 and 107, and switch means 142 is also shown for connecting the output of the rectifiers 109 and 110 to the motor armature 104. Alternatively, when only a single phase supply is available, the phase shifter 105 may be energized from the same phase as the rectifier 108, through a fixed phase shifting network which will displace the output voltage of the phase shifter so that the grid voltage of the rectifier can never lag by more than 180 degrees behind the voltage applied to the plate of the rectifier.

Figure 13:
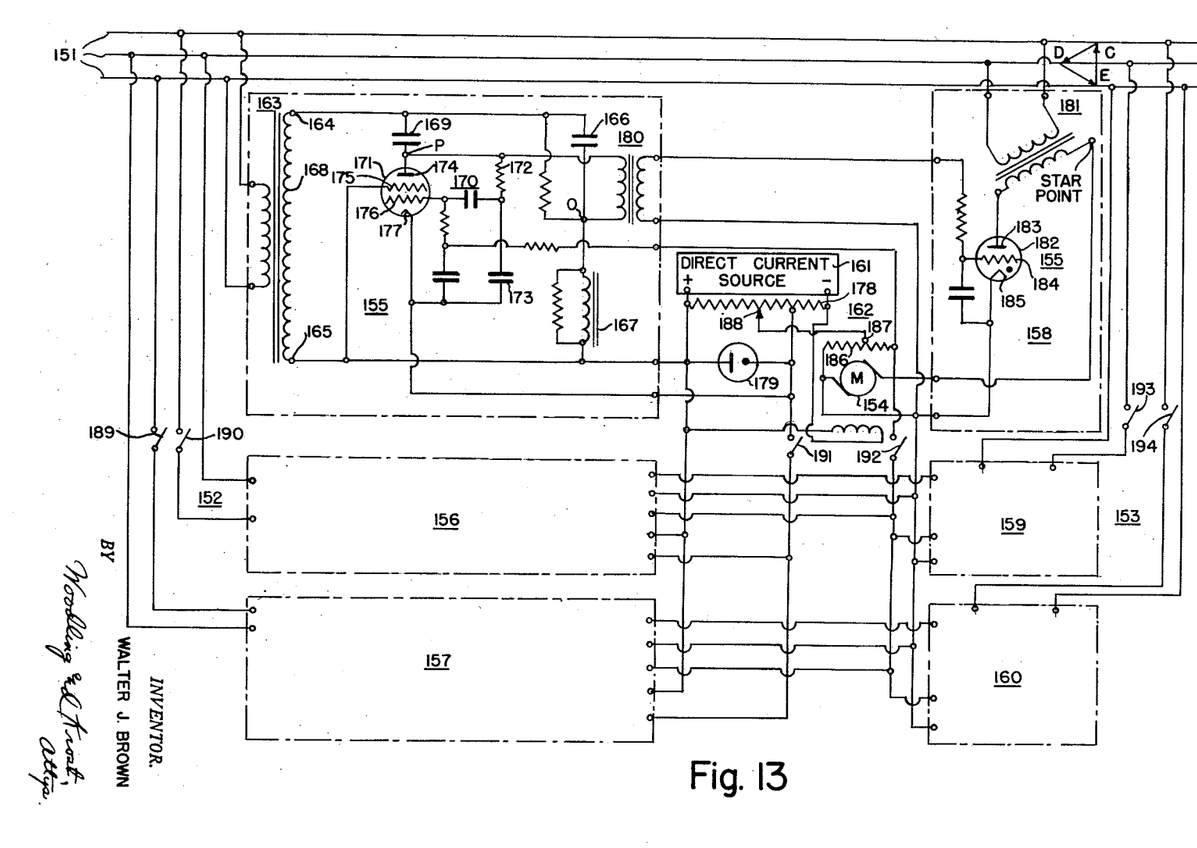
Figure 13 is a circuit diagram of a direct current motor system which includes the embodiment of my phase shifting system of Figure 7 to control a grid controlled rectifier for the said direct current motor.

Figure 13 illustrates my phase shifting bridge of Figure 7 as used in conjunction with a three phase power supply and a grid controlled rectifier for supplying rectified power to a direct current motor. The system includes generally, a direct current motor armature 154, a grid controlled rectifier system 153 for supplying rectified power to the motor armature 154, a phase shifting system 152 for controlling the grid controlled rectifier system 153, a direct current source 161 for supplying operating voltages to the phase shifting system 152, a controlled voltage source 162 for controlling the operating conditions of the phase shifting system 152, and a three phase supply source 151 for supplying alternating voltages to the phase shifting system 152 and to the grid controlled rectifier system 153. The phase shifting system 152 includes three phase shifters designated 155, 156 and 157, respectively. The grid controlled rectifier system 153 includes rectifiers 158, 159 and 160, respectively. The three phase supply source 151 has three phases C, D and E, with the phase shifters 155, 156 and 157 energized, respectively, from the phases C, D and E. The rectifiers 158, 159 and 160 are energized, respectively, from phases D, E and C. It will be seen that the rectifier 158 is energized from a different phase than the phase that is energizing the phase shifter 155. This has been done purposely as a safety measure, similar to that explained for the circuit of Figure 12. The motor control system of Figure 13 is operable with only the phase shifter 155 and the rectifier 158, omitting the phase shifters 156 and 157 and the rectifiers 159 and 160. For this reason, the latter two phase shifters and rectifiers have been shown as having switches 189 to 194, for disconnection from the supply voltages and the load, which is to illustrate that the motor control system is operable either with or without these elements as part of the motor control system. The motor control system may be fully described by describing only the phase shifter 155 and rectifier 158, which will describe the operation of only single phase power supplied to the motor armature 154.

The phase shifter 155 is of the type of phase shifting bridge as shown in the Figure 7, and vectorially illustrated in Figure 8. An input transformer 163, which is connected across phase C, has end terminals 164 and 165 on the secondary 168 thereof. A capacitance or capacitive element 166 and an inductance or inductive element 167 are serially connected across the ends 164 and 165 of the secondary 168, with the first output terminal O of the phase shifter connected therebetween. A capacitance or capacitive element 169 and a variable inductance or inductive element 170 are serially connected across the end terminals 164 and 165 with the second output terminal P of the phase shifter connected therebetween. The variable inductance 170 includes a thermionic tube 171, and a resistance 172 and capacitance 173 forming a quadrature feedback circuit to make the thermionic tube 171 exhibit the properties of a reactance tube, or in this case specifically as an inductance. The thermionic tube 171 has a plate 174, a screen grid 175, a control grid 176, and a cathode 177. Biasing and high voltage supplies are supplied to the tube 171 by a voltage divider 178 connected across the terminals of the direct current source 161. Positive direct current potentials are applied to the screen 175 and plate 174, and a negative potential is applied to the cathode 177. A voltage regulator tube 179 is connected across the plate and screen supply voltages. The operation of the phase shifter 155 is similar in operation to the operation of the circuit of Figure 7, wherein the potential of the output terminal P is variable throughout an arcuate locus by varying the variable inductance 170.

The rectifier 158 is illustrative of connection to one leg 181 of a delta-star connected three phase transformer. The secondary of the leg 181 has a rectifier tube 182 and the motor armature 154 serially connected across it. The rectifier tube 182 has a plate 183, a control grid 184 and a cathode 185. The output of the rectifier tube 182 is supplied to the motor armature 154 by the aforementioned series connection. The output of the phase shifter 155 is supplied through an output transformer 180 to the grid 184 with respect to the cathode 185 of the rectifier tube 182. The star point, illustrated at one end of the secondary of the transformer leg 181, would be the star point or common point of the secondary of the three phase transformer, if a three phase rectifier system were used.

The controlled voltage source 162 includes a shunt resistance 186 connected across the motor armature 154. The shunt resistance 186 has a tap connection 187 for supplying a direct current feedback voltage to the phase shifter 155 through a movable contact 188 on the voltage divider 178. The direct current feedback voltage obtained from the shunt resistance 186 supplies a negative controlled voltage to the grid 176 of the tube 171, whereas the voltage divider 178 supplies either a negative or a positive controlling voltage to control the amount of bias applied to the tube 171. The amount of bias supplied to the tube 171 determines the effective reactance of this tube, and consequently the operating position of the output terminal P on the arcuate locus of the voltage vector diagram. The operation of the circuit of Figure 13 is substantially the same as for the circuit of Figure 12, and therefore will not be repeated.

Figure 14:
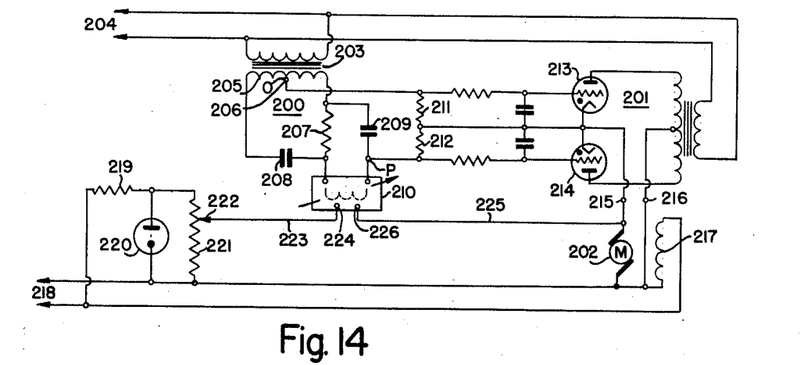
Figure 14 is a circuit diagram of a motor control system for motor armature energization from a rectifier controlled by a phase shift system of Figure 3.

The circuit of Figure 14 shows another form of energy conversion system using a phase shifter 200 which is of the form of phase shifter as shown in the Figure 3. The energy conversion system of Figure 14 includes, besides the phase shifter 200, a controllable rectifier 201 supplying rectified energy to a direct current motor armature 202. The phase shifter 200 includes an energizing transformer 203 having the primary thereof connected to an alternating current source 204 and having a secondary 205 with a center tap 206. Serially connected across the secondary 205 are a resistance 207 and a condenser 208. The voltage across the resistance 207 establishes the baseline voltage and connected across this resistance are a condenser 209 and a variable inductance 210. The variable inductance 210 has been shown as a rectangle with a symbol for an inductance shown dotted therein. The first output terminal O is connected at the center tap 206 and the second output terminal P is connected at the junction of the condenser 209 and inductance 210. The output of the phase shifter 200 therefore appears across the terminals O and P and is supplied to first and second impedances 211 and 212, respectively.

The controllable rectifier 201 is shown as a full wave rectifier including the push-pull connected rectifier tubes 213 and 214. The output from the phase shifter 200 is applied to the grids and cathodes of these rectifier tubes 213 and 214 in push-pull in a well-known manner to control the output of the rectifier 201 from maximum output down to a minimum which may be zero output. The output of the rectifier 201 appears at the first and second output terminals 215 and 216 and is applied across the motor armature 202. A field winding 217 is provided for the motor armature 202 and is energized from a direct current source 218. Also energized from the direct current source 218 is the series combination of a voltage dropping resistance 219 and a voltage regulator tube 220. Connected in parallel with the voltage regulator tube 220 is a voltage divider 221 having a movable tap 222. A lead 223 connects the movable tap 222 to a control terminal 224 on the variable inductance 210, and a lead 225 connects the positive end of the motor armature 202 to a second control terminal 226 on the variable inductance 210.

The operation of the motor control system of Figure 14 is in general similar to the operation of the motor control circuits of Figures 10, 12 and 13, since there is a phase shifter controlling a controllable rectifier supply variable energization to a direct current motor armature. The phase shifter 200 is a form of the phase shifter shown in Figure 3 wherein the branch circuit 32 has been shown specifically as a transformer secondary having a tap thereon. The vector diagram for the phase shifter 200 will be similar to the vector diagram of Figure 4, wherein the vectors $E_{30}$ and $E_{31}$ are collinear and preferably equal. Since the tap 206 of this secondary 205 has been shown as a center tap it would be advantageous to have the locus 29 of the output terminal P large enough so that the alternating current input voltage vector is substantially a diameter thereof. This would establish the point O' near the center of this circular arc 29. The arc 29 will be a circle if the Q of the inductance 210 remains constant while its impedance is varied. This may readily be accomplished by making the variable inductance a reactance tube as was done in the Figures 10, 12 and 13, or it may also be accomplished in other ways by using other forms of variable inductances, such as a saturable reactor.

It will be noted that the controlling voltage obtained at the movable tap 222 and the controlled voltage across the armature 202 are unidirectional voltages which are combined in opposition and applied to the control terminals 224 and 226. The controlled voltage from the armature 202 may be considered as a voltage feedback arrangement which may be used in conjunction with the controlling voltage from tap 222 for giving a signal usable to maintain the speed of the motor armature 202 substantially constant. Thus, this voltage may be termed as a control signal voltage. The voltage from the movable tap 222 may be considered as a controlling voltage for controlling the amount of impedance of the variable inductance 210, which in turn will affect the phase of the output voltage from the phase shifter 200 and hence control the speed of the motor armature 202. Thus, the voltage from the voltage divider 221 may be considered as a speed controlling voltage.

Figure 15:
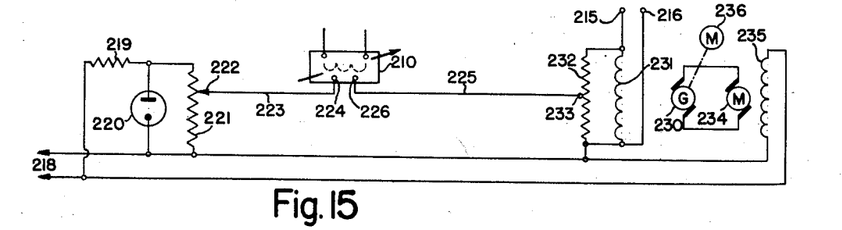
Figure 15 is a circuit diagram of a modification of the circuit of Figure 14 for generator field control.

The circuit of Figure 15 shows a modification which may be substituted for a portion of the motor control circuit of Figure 14. The circuit of Figure 15 is a generator field control circuit including a generator armature 230 and a generator field 231. In this case the generator field 231 is that which is connected to the output terminals 215 and 216 of the controllable rectifier 201, not shown in this Figure 15. Other circuit elements duplicated in this Figure 15 are the direct current source 218, the controlling voltage divider 221 and associated voltage regulator tube 220, and the variable inductance 210. Connected across the generator field 231 is a feedback resistance 232 having a tap 233. This tap 233 is connected by the lead 225 to the control terminal 226 of the variable inductance 210. The controlling voltage divider 221 again has a movable tap 222 connected by the lead 223 to the control terminal 224 of the variable inductance 210. The generator armature 230 is connected in loop circuit with a motor armature 234 having a field winding 235 energized from the direct current source 218. The generator armature 230 is driven from any suitable prime mover 236.

The operation of the modified circuit of Figure 15 is essentially the same as that for the motor armature control circuit of Figure 14. The output of the controllable rectifier at the terminals 215 and 216 is applied to the generator field 231 rather than to a motor armature; however, this variation in field energization will control the speed of the motor armature 234 in a well-known manner. The feedback of controlled voltage to the variable inductance 210 is a feedback of only a part of the voltage appearing across the generator field 231, rather than being a feedback of the entire rectifier output voltage. The voltage appearing at the control terminals 224 and 226 is again a control signal voltage which is used in some manner to control the impedance of the variable inductance 210.

The circuits of Figures 14 and 15 each have a safety feature inherent in the circuit arrangement. This safety feature is found in the choice of phase shifter 200 for use with this motor armature or generator field control system. The vector diagram of Figure 4 shows generally the vectors obtainable from the phase shifter 200 with the vector $E_{27}$ of this vector diagram being that which would signify the voltage vector of the variable inductance 210. Further the vector $E_{28}$ would be that which would signify the vector of the condenser 209. Thus, if the variable inductance 210 should fail for any reason, namely, have an open circuit therein, or if the condenser 209 should have a short circuit, the voltage across the variable inductance 210 relative to the voltage across the condenser 209 would be infinite, and thus the point P′ would rotate in a clockwise direction to a point at or near the point 23′ of this voltage vector diagram. At this point it will be observed that the output voltage vector $E_{out}$ will be approximately 180 degrees lagging the vector of the input voltage. This 180 degrees lagging relationship of the output of the phase shifter will establish the output of the rectifier 201 at a minimum to thus slow the speed of the motor armature 202 or 234 to a minimum and hence safe value.

Figure 16:
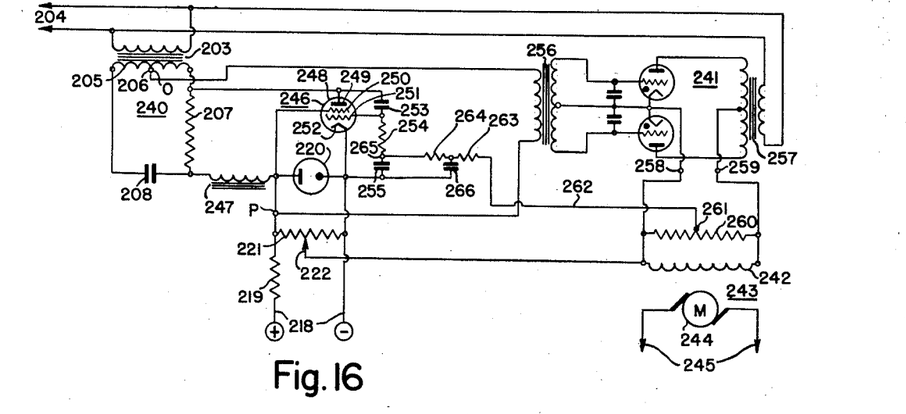
Figure 16 is a circuit diagram of a motor control system for motor field energization from a rectifier controlled by a phase shift system of Figure 3.

The circuit of Figure 16 is a controllable energy conversion system which includes a phase shifter 240, a controllable rectifier 241 and a field winding 242 of a direct current motor 243. The direct current motor 243 also has an armature 244 energized from a separate direct current source indicated at 245. The phase shifter 240 is energized through a transformer 203 from an alternating current source 204 and the transformer 203 has a secondary 205 with a center tap 206 which is also the first output terminal O of this phase shifter 240. The phase shifter 240 also includes the resistance 207 and condenser 208. Serially connected across the resistance 207 is a serially connected variable capacitance 246 and an inductance 247. The variable capacitance 246 includes a thermionic tube 248 having a plate 249, a screen grid 250, a control grid 251 and a cathode 252. A condenser 253 is connected between the plate 249 and the control grid 251, and a resistor 254 and condenser 255 interconnect the control grid 251 and cathode 252. The condenser 253 and resistor 254 establish that the voltage applied to the control grid 251 is approximately 90 degrees leading the voltage applied to the plate 249, both voltages being relative to the cathode 252. This 90 degrees leading grid voltage establishes that the thermionic tube 248 acts as a capacitance which is variable in accordance with the variations in bias voltage. A direct current source 218 supplies through a voltage dropping resistor 219 a voltage to the controlling voltage divider 221 which has a movable tap 222. Connected across the voltage divider 221 is a voltage regulator tube 220 with the cathode of this voltage regulator tube connected to the cathode 252 and the anode of this voltage regulator tube connected to the screen grid 250 of the thermionic tube 248. The second output terminal P of the phase shifter 240 is connected to the junction between inductance 247 and the voltage regulator tube 220 which, for alternating current purposes, is the junction of the inductance 247 and the variable capacitance 246. The output of the phase shifter 240, from the output terminals O and P, is supplied to a grid transformer 256, which in turn applies the phase shiftable output voltage to the controllable rectifier 241 which is shown as a full wave rectifier. This rectifier is also supplied from the alternating current source 204 through the power transformer 257. The output of the controllable rectifier 241 appears across the output terminals 258 and 259 and is thus applied across the motor field 242. Connected in parallel with the motor field 242 is a feedback resistor 260 having a tap 261. The tap 261 is connected by a lead 262 through the filter resistors 263 and 264 to the junction 265 of the resistor 254 and condenser 255. A filter condenser 266 interconnects the junction of the resistors 263 and 264 to the cathode 252.

In operation, the motor field control energization circuit of Figure 16 utilizes a phase shifter 240 which is similar to that shown in Figure 3. The variable capacitance 246 and the inductance 247 have the second output terminal P connected therebetween, and hence by varying the effective bias on the thermionic tube 248 the locus of the potential of this second output terminal P will vary on an arc which may approximate a circular arc since the variable capacitance 246 is a reactance tube. The bias on the reactance tube 248 is applied across the control grid 251 and cathode 252 which in effect is the voltage applied across the condenser 255. This bias voltage is a combination of a positive controlling voltage derived across the right-hand portion of the controlling voltage divider 221 and a negative controlled voltage derived from the left-hand end of the feedback resistor 260. The filter resistors 263 and 264 and the filter condenser 266 reduce the alternating current ripple from this feedback voltage in order to present substantially constant direct current biasing voltage to the thermionic tube 248. In this circuit of Figure 16 the variable element of the phase shifter 240 has been shown as a variable capacitance as a safety feature for this motor field energization circuit. In the event of failure of the thermionic reactance tube 248 the voltage drop thereacross will be very high compared to the voltage drop across the inductance 247 and hence the point P′ on the voltage vector diagram of Figure 4 will rotate in a counterclockwise direction to a point which is approximately 120 degrees leading relative to the alternating current input voltage, with which the anode voltage is in phase. Since the phase of the voltage on the two grids is 120 degrees leading relative to the respective anode voltages of the controllable rectifier 241, the rectifier 241 will have a full output to thus supply full field energization to the motor field 242. This will establish the speed of the motor armature 244 at a minimum value which will be a safe condition in the event of failure of the thermionic reactance tube 248.

The movable tap 222 is again a speed control since it controls the amount of controlling voltage, and the feedback voltage from the feedback resistor 260 is again a controlled voltage which together with the controlling voltage gives a control signal or bias voltage tending to maintain the unidirectional voltage across the field winding 242 at a constant value, irrespective of fluctuations in the voltage of the alternating current source 204.

Although the invention has been described in its preferred form with a certain degree of particularity, it is understood that the present disclosure of the preferred form has been made only by way of example and that numerous changes in the details of circuit construction and the combination and arrangement of circuit elements may be resorted to without departing from the spirit and the scope of the invention as hereinafter claimed.

What is claimed is:

1. An electrical control system for an electrical converter connected to an alternating current source and having control means for varying its power output to an electrical load, comprising, a phase shifting network having a phase shiftable output voltage between first and second output terminals, means for connecting said first and second output terminals to said control means of said converter, two series-connected relatively variable reactive elements of opposite sign, means for energizing said serially connected elements from a reference voltage derived from said alternating current source, said first output terminal being at the junction of said elements so that as the impedances of said elements are varied relatively to one another, the locus of the potential of the first output terminal lies, in a vector diagram, on an arc spanning the reference voltage vector, means for establishing said reference voltage at a phase angle relative to said alternating current source that if the relative impedance ratio of said elements tends toward infinity in a given sense the output voltage vector tends to become parallel to the vector of a voltage of said alternating current source, circuit elements energized from said alternating current source, and means for connecting said second output terminal to said circuit elements so that the potential of said second output terminal lies, in the vector diagram, within the space bounded by the reference voltage vector and said arc.

2. An electrical control system as claimed in claim 1, in which the arc spanning the reference voltage vector subtends at the second output terminal an angle substantially greater than 180 degrees.

3. An electrical control system as claimed in claim 1, in which at least one of the reactive elements comprises a thermionic tube provided with a quadrature feedback circuit so that it acts as a reactive element.

4. An electrical control system as claimed in claim 3, in which the thermionic reactance tube has a control electrode and the effective impedance of such reactive element is varied by regulating the bias voltage applied to said electrode.

5. An electrical control system as claimed in claim 4, in which a voltage from the quadrature feedback circuit and the variable bias voltage are applied to the same control electrode of the tube.

6. An electrical control system for an electrical converter connected to an alternating current source and having control means for varying its power output to an electrical load, comprising, a phase shifting network having a phase shiftable output voltage between first and second output terminals, means for connecting said first and second output terminals to said control means of said converter, two series-connected relatively variable reactive elements of opposite sign, means for energizing said serially connected elements from a reference voltage derived from said alternating current source, said first output terminal being at the junction of said elements so that as the impedances of said elements are varied relatively to one another, the locus of the potential of the first output terminal lies, in a vector diagram, on an arc spanning the reference voltage vector, means for establishing said reference voltage at a phase angle relative to said alternating current source that if the relative impedance ratio of said elements tends toward infinity in a given sense the output voltage vector tends to become parallel to the vector of a voltage of said alternating current source, circuit elements energized from said alternating current source, means for connecting said second output terminal to said circuit elements so that the potential of said second output terminal lies, in the vector diagram, within the space bounded by the reference voltage vector and said arc, means for developing a controlled voltage proportional to the voltage applied to said load, means for developing a controlling voltage, means for balancing said controlled voltage against said controlling voltage to establish a resultant voltage, and means for controlling the relative impedance of said reactive elements by said resultant voltage to maintain the voltage across the load substantially stable at a value determined by the controlling voltage.

7. An electrical control system as claimed in claim 1, in which the reference voltage for the phase shifting network is derived across one of first and second impedances connected at least partly in series and energized from the alternating current source, one of said impedances being reactive so that the voltages across them are substantially in quadrature, and the two series-connected reactive elements being connected across one of said impedances.

8. An electrical control system as claimed in claim 7, in which one of said output terminals is common with a terminal of said alternating current source.

9. An electrical control system as claimed in claim 1, in which the reference voltage for the phase shifting network is derived across one of first and second impedances connected at least partly in series and energized from the alternating current source, one of said impedances being reactive so that the voltages across them are substantially in quadrature, and the two series-connected reactive elements being connected across one of said impedances, said circuit elements including third and fourth impedance means connected in series and energized by the alternating current source and having the second output terminal in the connection between them.

10. An electrical control system as claimed in claim 9, in which the third and fourth impedance means are such that the voltages across them have substantially the same phase angle.

11. An electrical control system as claimed in claim 1, in which the reference voltage for the network is derived from a first impedance energized from the alternating current source, the arrangement being such that the reference voltage is substantially in phase with but is less than the voltage across said first impedance.

12. An electrical control system as claimed in claim 11, in which the two series-connected reactive elements are connected to tapping points on the first impedance, second and third series-connected impedances connected across the first impedance, at least one of said second and third impedances being reactive, the second output terminal being in the connection between the second and third impedances.

13. An electrical control system as claimed in claim 1, in which said two series-connected reactive elements are connected in parallel with a circuit consisting of two series-connected reactive arms of opposite sign and having the second output terminal in the connection between them, the arrangement being such that the phase angle between the voltages across said arms is approximately twice the phase angle between the voltages across said elements.

14. An electrical control system as claimed in claim 1, in which the circuit elements are serially connected reactive arms of opposite sign having the second output terminal therebetween, means for energizing said reactive arms from said alternating current source, the product of the circuit Q and the energizing voltage for the reactive elements being substantially twice as great as the same product for the reactive arms.

15. An electrical control system as claimed in claim 1, in which the alternating current source is a polyphase source and the phase shifting network is supplied from a phase of the source other than the phase supplying said controllable converter.

16. An electrical control system as claimed in claim 1 for the speed control of a direct current motor supplied from the converter output, said alternating current source being three phase, said converter including a space discharge device having a control electrode and an anode, the inductive reactance of the series-connected reactive elements being a reactance tube, said reference voltage of the network being derived from a phase of the source which lags by 120 degrees with respect to the phase supplying the converter space discharge device controlled by such network whereby in event of failure of the reactance tube, the voltage supplied to the control electrode of the discharge device is approximately 180 degrees out of phase with its anode voltage and the supply to the motor from the discharge device is cut off.

17. An electrical control system as claimed in claim 1 for the speed control of a direct current motor supplied from the converter output, said alternating current source being single phase, said converter having an anode and a control electrode, the inductive reactance of the series-connected reactive elements being a reactance tube, and a transformer connected to one of said anode and control electrode in the appropriate sense so that in event of failure of the reactance tube the voltage supplied to the converter control electrode is approximately 180 degrees out of phase with the corresponding anode voltage whereby the supply to the motor from the converter is cut off.

WALTER J. BROWN.

References Cited in the file of this patent

UNITED STATES PATENTS

| Number | Name | Date |
| --- | --- | --- |
| 1,719,866 | Alexanderson | July 9, 1929 |
| 1,851,692 | Zucker | Mar. 29, 1932 |
| 1,894,114 | Mittag | Jan. 10, 1933 |
| 1,986,622 | Case | Jan. 1, 1935 |
| 2,194,357 | Green | Mar. 19, 1940 |
| 2,537,767 | Langenwalter | Jan. 9, 1951 |